United States Patent [19]
Martin et al.

[11] 3,812,260
[45] May 21, 1974

[54] 2,4,5-HALOGENIMIDAZOLES FOR COMBATING INSECTS AND ACARINA

[75] Inventors: Henry Martin, Basel, Switzerland; Georg Pissiotas, Loerrach, Germany

[73] Assignee: Ciba-Geigy AG, Basle, Switzerland

[22] Filed: Sept. 29, 1970

[21] Appl. No.: 76,635

[30] Foreign Application Priority Data
Oct. 8, 1969   Switzerland............................ 15136

[52] U.S. Cl. ............................................... 424/273
[51] Int. Cl. ............................................ A01n 9/22
[58] Field of Search .................................... 424/273

[56] References Cited
UNITED STATES PATENTS
2,953,492   9/1960   Dugains ............................ 424/273

OTHER PUBLICATIONS
Chemical Abstracts 62:13782g (1965).
Chemical Abstracts 62:P15362 a & b (1965).

Primary Examiner—Albert T. Meyers
Assistant Examiner—Leonard Schenkman
Attorney, Agent, or Firm—Frederick H. Rabin

[57] ABSTRACT

The use of 2,4,5-halogenimidazoles of the formula

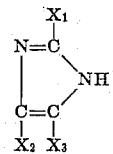

order
wherein $X_1$, $X_2$ and $X_3$ each denote a halogen atom, with the proviso that at least one of the substituents $X_1$, $X_2$ and $X_3$ is fluorine, bromine or iodine, for combating harmful insects and representatives of the ordr Acarina.

4 Claims, No Drawings

2,4,5-HALOGENIMIDAZOLES FOR COMBATING INSECTS AND ACARINA

The present invention relates to the use of 2,4,5-halogenimidazoles as active substances for combating insects and representatives of the order Acarina. These imidazole derivatives correspond to the formula

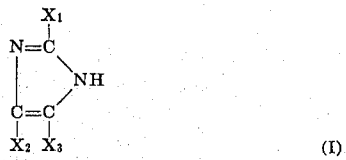

wherein $X_1$, $X_2$ and $X_3$ each denote a halogen atom, with the proviso that at least one of the substituents $X_1$, $X_2$ and $X_3$ is fluorine, bromine or iodine.

F, Cl, Br and I are here to be understood by halogen atoms.

Compounds of particular importance are those of formula

where $X_4$, $X_5$ and $X_6$ each denote a chlorine or bromine atom, with the proviso that at least one of the substituents $X_4$, $X_5$ and $X_6$ is bromine.

Examples of compounds of formula II are, amongst others:

| | | Melting point, °C. |
|---|---|---|
| (III) | Br–C(=N)–NH–C(Br)=C(Br) | 221–222 |
| (IV) | Br–C(=N)–NH–C(Cl)=C(Cl) | 229–230 |
| (V) | Br–C(=N)–NH–C(Br)=C(Cl) | 212–214 |

Processes for the manufacture of such trihalogenimidazoles have already been described in detail. They can be manufactured according to methods which are in themselves known, for example by halogenation of imidazole with compounds which split off halogen, such as for example hypohalites.

The compounds of formula I exhibit a broad biocidal action and can be employed for combating very diverse vegetable and animal pests. They are however above all suitable for combatting insects and representatives of the order Acarina, such as for example mites and ticks, as well as all their stages of development, such as eggs, larvae and pupae. Their outstanding action against various representatives of household pests and storage pests should be particularly highlighted. These pets include, say, cockroaches, such as for example Phyllodromia germanica, Periplaneta americana and Blatta orientalis; weevils, such as for example Tenebrio molitor, Dermestes frischii, Attagenus piceus and Sitophilus granarius; crickets such as for example Acheta domestica. Their action against ectoparasites on animals, and against aphides on plants, should furthermore also be mentioned.

By ectoparasites on animals there are intended to be understood, in the widest sense, those pests which attack farm animals, but also wild animals, and are possible carriers of viruses and baceteria. A wide-spread group of ectoparasites belongs to the order Acarina. Representatives of the order Acarina are, for example, Eulaelaps, Echinolaelaps, Laelaps, Haemogamasus, Dermanyssus, Ornithonyssus, Allodermanyssus, especially Allodermanyssus sanguineus, Pneumonyssus, Amblyomma, Aponaomma, Bocphilus, Dermacentor, Haemophysalis, Hyalomma, Ixodes, Margaropus, Rhipicephalus, Ornithodorus, Otobius, Cheyletidae, for example Cheyletus, Psorergates, Demodicidae, Trombiculidae, for example Trombicula, Eutrombicula, Schongastia, Acomatacurus, Neoschongastia, Euschongastia, Sarcoptiformes for example Notoedres, Sarcoptes, Knemidokoptes, Psoroptidae, for example Psoroptes, Chorioptes, Otodectes and the like. To the abovementioned pests there may also be added other, stinging and possibly disease-transmitting insects, such as for example Aedes aegypti, Lucilia sericata and the like.

This recital of examples of pests does not claim to be complete.

The favourable toxicites to warm-blooded animals of the compounds of formula I, or of agents containing these, should also be highlighted.

The substances of formula I can be employed by themselves or together with a suitable carrier and/or other adjuvants. Suitable carriers and adjuvants can be solid or liquid and correspond to the substances which are customary in formulation technology, such as for example natural or regenerated mineral substances, solvents, diluents, dispersing agents, wetting agents, adhesives, thickeners, binders or fertilisers. Furthermore, yet other biocidal compounds can be added. Such biocidal compounds can for example belong to the class of the ureas, the saturated and unsaturated halogeno-fatty acids, halogenobenzonitriles, halogenobenzoic acids, phenoxyalkylcarboxylic acids, carbamates, triazines, nitroalkylphenols, organic phosphoric acid compounds, quaternary ammonium salts, sulphamic acids, arsenates, arsenites, borates or chlorates. Such compounds are, for example:

PHOSPHORIC ACID DERIVATIVES

Bis-0,0-diethylphosphoric acid anhydride (TEPP)
0,0,0,0-Tetrapropyldithiopyrophosphate
Dimethyl(2,2,2-trichloro-1-hydroxyethyl)phosphonate (trichlorfon)
1,2-Dibromo-2,2-dichlorethyldimethylphosphate (naled)
2,2-Dichlorovinyldimethylphosphate (dischlorfos)
2-Methoxycarbamyl-1-methylvinyldimethylphosphate (mevinphos)
Dimethyl-1-methyl-2-(methylcarbamoyl)vinylphosphate cis (monocrotophos)
3-(Dimethoxyphosphinyloxy)-N-methyl-N-methoxy-cis-crotonamide
3-(Dimethoxyphosphinyloxy)-N,N-dimethyl-cis-crotonamide (dicortophos)
2Chloro-2-diethylcarbamoyl-1-methylvinyldimethyl-phosphate (phosphamidon)
0,0-Diethyl-0,2-(ethylthio)-ethylthiophosphate (demeton)
0,0-Diethyl-S-2-(ethylthio)-ethylthiophosphate
S-Ethylthioethyl-0,0-dimethyl-dithiophosphate (thiometon)
0,0-Diethyl-S-ethylmercaptomethyldithiophosphate (phorate)
0,0-Diethyl-S-2-[(ethylthio)ethyl]dithiophosphate (disulfoton)
0,0-Dimethyl-S-2 -(ethylsulphinyl)ethylthiophosphate (oxydemetonmethyl)
0,0-Dimethyl-S-(1,2-dicarbethoxyethyl)dithiophosphate (malathion)
(0,0,0,0-Tetraethyl-S,S'-methylene-bis-[dithiophosphate](ethion)
0-Ethyl-S,S-dipropyldithiophosphate
0,0-Dimethyl-S-(N-methyl-N-formylcarbamoylmethyl)-diothiophosphate (formotion)
0,0-Dimethyl-S-(N-methylcarbamoylmethyl)dithiophosphate (dimethoate)
0,0-Dimethyl-S-(N-ethylcarbamoylmethyl)dithiophosphate (ETHOATEMETHYL)
0,0-Diethyl-S-(N-isopropylcarbamoylmethyl)-dithiophosphate (prothoate)
S-N-(1-Cyano-1-methylethyl)carbamoylmethyldiethylthiolophosphate (CYANTHOATE)
S-(2-Acetamidoethyl)-0,0-dimethyldithiophosphate
Hexamethylphosphoric acid triamide (HEMPA)
0,0-Dimethyl-0-p-nitrophenylthiophos (PARATHION-METHYL)
0,0-Diethyl-0-p-nitrophenylthiophosphate (parathion)
0-Ethyl-0-p-nitrophenylphenylthiophosphonate (EPN)
0,0-Dimethyl-0-(4-nitro-m-tolyl)thiophosphate (FENITROTHION)
0,0-Dimethyl-0-(2-chloro-4-nitrophenyl)thiophosphate (dicapthon)
0,0-Dimethyl-0-p-cyanophenylthiophosphate (CYANOX)
0-Ethyl-0-p-cyanophenylphenylthiophosphonate
0,0-Diethyl- 0-2,4-dichlorophenylthiophosphate (DICHROFENTHION)
0-2,4-Dichlorophenyl-0-methylisopropylamidothisophosphate
0,0-Dimethyl-02,4,5-trichlorophenylthiophosphate (ronnel)
0-Ethyl-0-2,4,5-trichlorophenylethylthiophosphonate (TRICHLORONATE)
0,0-Dimethyl-0-2,5-dichloro-4-bromophenylthiophosphate (bromophos)
0,0-Diethyl-0-2,5-dichloro-4-bromophenylthiophosphate (bromophos-ethyl)
0,0-Dimethyl-0-(2,5-dichlor-4-iodophenyl)-thiophosphate (IODOFENPHOS)
4-tert. Butyl-2-chlorophenyl-N-methyl-0-methylamidophosphate (crufomate)
Dimethyl-p-(methylthio)phenylphosphate
0,0-Dimethyl-0-(3-methyl-4-methylmercaptophenyl)thiophosphate (FENTHION)
Isopropylamino-0-ethyl-0-(4-Methylmercapto-3-methylphenyl)-phosphate
0,0-Diethyl-0-p-[(methylsulphinyl)phenyl]-thiophosphate (FENSULFOTHION)
0,0-Dimethyl-0-p-sulphamidophenylthiophosphate
0-[p-(Dimethylsulphamido)phenyl]0,0-dimethylthiophosphate (FAMPHUR)
0,0,0',0'-Tetramethyl-0,0'-thiodi-p-phenylenethiophosphate
0-(p-(p-Chlorophenyl)azophenyl) 0,0-dimethylthiophosphate (azothoate)
0-Ethyl-S-phenyl-ethyldithiophosphonate
0-Ethyl-S-4-chlorophenyl-ethyldithiophosphonate
0-Ethyl-S-4-chlorophenyl-ethyldithiophosphonate
0-Isobutyl-S-p-chlorophenyl-ethyldithiophosphonate 0,0-Dimethyl-S-p-chlorophenylthiophosphate
0,0-Pivaloyl-indane-
0,0-Diethyl-p-chlorophenylmercaptomethyl-dithiophosphate (carbophenothion)
0,0-Diethyl-S-p-chlorophenylthiomethyl-thiophosphate
0,0-Dimethyl-S-)carbethoxy-phenylmethyl)dithiophosphate (phenothoate)
0,0-Diethyl-S-)carbofluorothoxy-phenylmethyl)-diethiophosphate
0,0-Dimethyl-S-(carboisophropoxy-phenylmethyl)-dithiophosphate
0,0-Dimethyl-0-(alpha-methylbenzyl-3-hydroxy-crotonyl)phosphate,
2-Chloro-1-(2,4-dichlorophenyl)vinyl-diethylphosphate (chlorfenvinphos)
2-Chloro-1-(2,4,5-trichlorophenyl)vinyl-dimethylphosphate
0-(2-chloro-1-(2,5-dichlorophenyl)vinyl)-0,0-diethylthiophosphate
Phenylglyoxylonitriloxime-0,0-diethylthiophosphate (phoxim)
0,0-diethyl-0-(3-chloro-4-methyl-2-oxo-2-H-1-benzopyran-7-yl)-thiophosphate (coumaphos)
0,0-Diethyl-7-hydroxy-3,4-tetramethylene-coumarinyl-thiophosphate (coumithoate)
2,3-p-Dioxanedithiol-S,S-bis(0,0-diethyldithiophosphate) (dioxathion)
2-Methoxy-4-H-1,3,2--benzodioxaphosphorine-2-sulphide
0,0-Diethyl-0-(5-phenyl-3-isooxyzolyl (sic)) thiophosphate S-[(6-Chloro-2-oxo-3-benzoxazolinyl)methyl]0,0-diethyldithiophosphate (phosalone)
2-(Diethoxyphosphinylimino)-4-methyl-2,3-dithiolane
0,0-Dimethyl-S-[2-methoxy-1,3,4-thiadiazol-5-(4H)-onyl-(4)-methyl]dithiophosphate
Tris-(2-methyl-1-aziridinyl)-phosphine-oxide (metepa)
0,0-Dimethyl-S-phthalimidomethyl-dithiophosphate
S-(2-Chloro-1-phthalimidoethyl)-0,0-diethyldithiophosphate
N-Hydroxynaphthalimido-diethylphosphate
Dimethyl-3,5,6-trichloro-2-pyridylphosphate
0,0-Dimethyl-0-(3,5,6-trichloro-2-pyridyl)thiophosphate
0,0-Diethyl-0-(3,5,6-trichloro-2-pyridyl)thiophosphate
0,0-Diethyl-0-2-pyrazinylthiophosphate (thionazin)
0,0-Diethyl-0-(2-isopropyl-4-methyl-6-pyrimidyl)thiophosphate(diazinon)
0,0-Diethyl-0-(b 2-quinoxylyl)thiophosphate
0,0-Dimethyl-S-(4-oxo-1,2,3-benzotriazin-3(4H)-ylmethyl)-dithiophosphate (azinphosmethyl)
0,0-Diethyl-S-(4-oxo-1,2,3-benzotriazin-3(4H)-ylmethyl)-dithiophosphate (azinphosethyl)
S-[(4,6-Diamino-s-triazin-2-yl)methyl]-0,0-dimethyldithiophosphate (menazon)
S-[2-(Ethylsulphonyl)ethyl]dimethylthiolphosphate (dioxydemeton-S-methyl)
Diethyl-S-[2-(ethylsulphinyl)ethyl]dithiophosphate (oxydisulfoton)
Bis-0,0-diethylthiophosphoric acid anhydride (sulfotepp)
Dimethyl-1,3-di(carbomethoxy)-1-propen-2-yl-phosphate
Dimethyl-(2,2,2-trichloro-1-butyroyloxyethyl)phosphonate (butonate)
0,0-Dimethyl-0-(2,2-dichloro-1-methoxyvinyl)phosphate
0,0-Dimethyl-0-(3-chloro-4-nitrophenyl)thiophosphate (chlorthion)
0,0-Dimethyl-0(or S)-2-(ethylthioethyl)thiophosphate (demeton-S-methyl)
Bis-(dimethylamido)fluorophosphate (dimefox)
2-(0,0-Dimethyl-phosphoryl-thiomethyl)-5-methoxy-pryone-4
3,4-Dichlorobenzyl-triphenylphosphonium chloride
Dimethyl-N-methoxymethylcarbamoylmethyl-dithiophosphate(FORMOCARBAM) ethoxymethylcarbamoylmethyl-dithiophosophate
0,0-Diethyl-0-(2,2-dichloro-1-chlorethoxyvinyl)-phosphate
0,0-Dimethyl-0-(2,2-dichloro-1-chlorethoxyvinyl)-phosphate
0-Ethyl-S,S-diphenyldithiolphosphate
0-Ethyl-S-benzyl-phenyldithiophosphonate
0,0-Diethyl-S-benzyl-thiolphosphate
0,0-Dimethyl-S-(4-chlorophenylthiomethyl)dithiophosphate(methylcarbophenothion)
0,0-Dimethyl-S-(ethylthiomethyl)dithiophosphate
Diisopropylaminofluorophosphate (MIPAFOX)
0,0-Dimethyl-S-(morpholinylcarbamoylmethyl)dithiophosphate(morphothion)
Bismethylamido-phenylphosphate
0,0-Dimethyl-S-(benzenesulphonyl)dithiophosphate
0,0-Dimethyl-(S and 0)-ethylsulphinylethylthiophosphate
0,0-Diethyl-0-4-nitrophenylphosphate
0,0-Diethyl-S-(2,5-dichlorophenylthiomethyl)dithiophosphate (phendapton)
Triethoxy-isopropoxy-bis (thiophosphinyl)disulphide
0,0-Diethyl-0-(4-methyl-coumarinyl-7)-thiophosphate (POTASAN)
2-Methoxy-4H-1,3,2-benzodioxaphosphorine-2-oxide
Octamethylpyrophosphoramide (schradan)
Bis(dimethoxythiophosphinylsulphido)-phenylmethane
5-Amino-bis(dimethylamido)phosphinyl-3-phenyl-1,2,4-triazole (triamiphos)
N-Methyl-5-(0,0-dimethylthiolphosphoryl)-3-thiavaleramide (vamidothion) and
N,N,N', N'-Tetramethyldiamidofluorophosphate (dimefox)

CARBAMIC ACID DERIVATIVES

1-Naphthyl-N-methylcarbamte (carbaryl)
2-Butinyl-4-chlorophenylcarbamate
4-Dimethylamino-3,5-xylyl-N-methylcarbamate
4-Dimethylamino-3-tolyl-N-methylcarbamate (aminocarb)
4-Methylthio-3,5-xylyl-N-methylcarbamate (methiocarb)
3,4,5-Trimethylphenyl-N-methylcarbamate 2
2-Chlorophenyl-N-methylcarbamate (CPMC)
5-Chlor-6-oxo-2-norbornane-carbonitrile-0-(methylcarbamoyl)-oxime
1-(Dimethylcarbamoyl)-5-methyl-3-pyrazolyl-N,N-dimethylcarbamate (dimetilan)
2,3-Dihydro-2,2-dimethyl-7-benzofuranyl-N-methylcarbamate (carbofuran)
2-Methyl-2-methylthio-propionaldehyde-0-(methylcarbamoyl)-oxime (aldicarb)
8-Quinaldyl-n-methylcarbamate and its salts
Methyl 2-isopropyl-4-methylcarbamoyloxy)carbanilate
m-(1-Ethylpropl)phenyl-W-methylcarbamate
3,5-Di-tert.butyl-W-methylcarbamate
m-(1-Methylbutyl)phenyl-N-methylcarbamate
2-Isopropylphenyl-N-methylcarbamate
2-sec. Butylphenyl-N-methylcarbamate
M-Tolyl-N-methylcarbamate
2,3-Xylyl-N-methylcarbamate
3-Isopropylphenyl-N-methylcarbamate
3-tert. Butylphenyl-N-methylcarbamate
3-sec.-Butylphenyl-N-methylcarbamate
3-Isopropyl-5-methylphenyl-N-methylcarbamate (promecarb)
3,5-Diisopropylphenyl-N-methylcarbamate
2-Chloro-5-isopropylphenyl-N-methylcarbamate
2-Chloro-4,5-dimethylphenyl-N-methylcarbamate
2-(1,3-Dioxolan2-yl)phenyl-N-methylcarbamate (dioxycarb)
2-(4,5-Dimethyl-1,3-dioxolan-2yl)phenyl-N-methylcarbamate yl)henyl-N-methylcarbamate
2-(1,3-Dioxan-2-yl)phenyl-N-methylcarbamate
2-(1,3-Dithiolan-2-yl)phenyl-N-methylcarbamate
2-(1,3-Dithiolan-2-yl)phenyl-N,N-dimethylcarbamate 2-Isopropoxyphenyl-W-methylcarbamate (arprocarb)
2-(2-Propinyloxy)phenyl-N-methylcarbamate
3-(2-Propinyloxy)phenyl-W-methylcarbmate
2-Dimethylaminophenyl-N-methylcarbamate
2-Diallylaminophenyl-N-methylcarbamate
4-Diallylamino-3,5-xylyl-N-methylcarbamate (allyloxycarb)
2,3-Dihydro-2-methyl-7-benzofuranyl-N-methylcarbamate
3-Methyl-1-phenylpyrazol-5-yl-N,N-dimethylcarbamate
1-Isopropyl-3-methylpyrazol-5-yl-N,N-dimethylcarbamate (isolan)
2-(N',N'-Dimethylcarbamoyl)-3-methylpyrazol-5-yl-N,N-dimethylcarbamate
2-Dimethylamino-5,6-dimethylpyrimidin-4-yl-N,N-dimethylcarbamate
3 Methyl4-dimethylaminomethyleneiminophenyl-N-methylcarbamate
3-Dimethylamino-methyleneiminophenyl-N-methylcarbamate
1-Methylthio-ethylimino-N-methylcarbamate (methoxymyl)
2-Methylcarbamoyloxyimino-1,3-dithiolane
5-Methyl-2-methylcarbamoyloxyimino-1,3-oxathiolane
2-(1-Methoxy-2-propoxy)phenyl-N-methylcarbamate
2-(1-Butin-3-yl-oxy)phenyl-N-methylcarbamate
3-Methyl-4-(dimethylamino-methylmercapto-methyleneimino) phenyl-N-methylcarbamate
1,3-Bis(carbamoylthio)-2-(N,N-dimethylamino)-propane hydrochloride
5,5Dimethylhydroresorcinoldimethylcarbamate
2-[Propargylethylamino]-phenyl-N-methylcarbamate
2-[Propargylmethylamino]-phenyl-N-methylcarbamate
2-[Dipropargylamino]-phenyl-N-methylcarbamate
3-Methyl-4-[dipropargylamino]-phenyl-N-methylcarbamate
3,5-Dimethyl-4-[dipropargylamino]-phenyl-N-methylcarbamate
2-[Allyl-isopropylamino]-phenyl-N-methylcarbamate and
3-[Allyl-isopropylamino]-phenyl-N-methylcarbamate.

CHLORINATED HYDROCARBONS

γ-Hexachlorocyclohexane [Gammexane; lindane; γ HCH]
1,2,4,5,6,7,8,8-Octachloro-3α,4,7,7α'-tetrahydro-4,7-methyleneindane (chlordan)
1,4,5,6,7,8,8-Heptachloro-3α,4,7,7α-tetrahydro-4,7-methyleneindane (heptachlor)
1,2,3,4,10,10-Hexachloro-1,4,4α,5,8,8α-hexahydro-endo-1,4-exo-5,8-dimethanonaphthalene [aldrin]
1,2,3,4,10,10-Hexachloro-6,7-epoxy-1,4,4α,5,6,7,8,8α-octaphydro-exo-1,4-endo-5,8-dimethanonaphthalene [dieldrin]
1,2,3,4,10,10-Hexachloro-6,7-epoxy-1,4,4α,5,6,7,8,8α-octahydro-1,4-endo-endo-5,8-dimethanonaphthalene [endrin]
6,7,8,9,10,10-Hexachloro-1,5,5α,6,9,9α-hexahydro-6,9-methano-2,3,4-benzo[e]-dioxa-therpene-3-oxide [endosulfan]
Chlorinated camphor [toxaphene]
Decachloroctahydro-1,3,4-metheno-2H-cyclobuta[e d]pentalen-2-one
Dodecachlorooctahydro-1,3,4-metheno-1H-cyclobuta[c d] pentalene[Mirex]
Ethyl-1,1α,3,3α,4,5,5,5α,5α76-decachlorooctahydro-2-hydroxy-1,3,4-metheno-1H-cyclobuta[c d]pentalene-2-laevulinate
Bis(pentachloro-2,4-cyclopentadien-1-yl)
o-dinoctone
1,1,1-Trichloro-2,2-bis(p-chlorophenyl)ethane [DDT]
Dichlorodiphenyl-dichloroethane [TDE]
Di(p-chlorophenyl)-trichloromethylcarbinol [dicofol]
Ethyl-4,4'-dichlorophenylglycollate (chlorobenzilate)
Ethyl-4,4'-dibromobenzylate (bromobenzilate)
Isopropyl-4,4'-dichlorobenzylate
1,1,1-Trichloro-2,2-bis(p-methoxyphenyl)ethane (methoxychloro)
Diethyl-diphenyl-dichlorethane
Decachloropentacyclo(3,3,2,0$^{2,6}$,0$^{3,9}$,0$^{7,10}$)decan-4-one[Chlordecone].

Nitrophenols and Derivatives 4,6-Dinitro-6-methylphenol Na salt (dinitrocresol)
Dinitrobutylphenol-2,2',2''-triethanolamine salt
2-Cyclohexyl-4,6-dinitrophenol [Dinex]
2-(1-Methylheptyl)-4,6-dinitrophenyl-crotonate [dinocap]
2 sec.-Butyl-4,6-dinitrophenyl-3-methyl-butenoate [binapacryl]
2 sec.-Butyl-4,6-dinitrophenyl-cyclopropionate and
2 sec.-Butyl-4,6-dinitrophenyl-isopropyl-carbonate [dinobuton]

Various Substances

Sabadilla
Rotenone
Cevadine
Veratridine
Ryania
Pyrethrin
3-Allyl-2-methyl-4-oxo-2-cyclopenten-1-yl-chrysanthemumate(allethrin)
6-Chloropiperonyl-chrysanthemumate (barthrin)
2,4-Dimethylbenzyl-chrysanthemumate (dimethrin)
2,3,4,5-Tetrahydrophthalimidomethyl-chrysanthemumate
(5-Benzyl-3-furyl)-methyl-2,2-dimethyl-3-(2-methylpropanyl) cyclopropanecarboxylate
Nicotine
Bacillus thuringiensis Berliner
Dicyclohexylcarbodiimide
Diphenyldiimide [azobenzene]
4-Chlorobenzyl-4-chlorophenylsulphide [chlorbenside]
Creosote oil
6-Methyl-2-oxo-1,3-dithiolo-[4,5-b]-quinoxaline [quinomethionate]
(l)-3-(2-Furfuryl)-2-methyl-4-oxocyclopent-2-enyl(l)-(cis+trans)chrysanthemum-monocarboxylate [furethrin]
2-Pivaolyl-idane-1,3-dione [pindone]

2-Fluoroethyl(4-bisphenyl)acetate
2-Fluoro-N-methyl-N(1-naphthyl)-acetamide
Pentachlorophenol and salts
2,2,2-Trichloro-N-(pentachlorophenyl)-acetimidoyl chloride
N'-(4-Chloro-2-methylphenyl)-N,N-dimethylformamidine (Chlorophenamidine)
4-Chlorobenzyl-4-fluorophenyl-sulphide (fluorobenside)
5,6-Dichloro-1-phenoxycarbanyl-2-trifluoromethylbenzimidazole (Fenozaflor)
Tricyclohexyl-stannic hydroxide
2-Thiocyanatoethyl-lauric acid ester
β-Butoxy-β'-thiocyanatodiethyl-ether
Isobornyl-thiocyanatoacetate
p-Chlorophenyl-p-chlorobenzenesulphonate (ovex)
2,4-Dichlorophenyl-benzenesulphonate
p-Chlorophenyl-benzenesulphonate (Fenson)
p-Chlorophenyl-2,4,5-trichlorophenylsulphone (tetradifon)
p-Chlorophenyl-2,4,5-trichlorophenylsulphide (tetrasul)
Methyl bromide
p-Chlorophenyl-phenylsulphone
p-Chlorobenzyl-p-chlorophenylsulphide (chlorobenside)
4-Chlorophenyl-2,4,5-trichlorophenylazosulphide
2(p-tert.-Butylphenoxy-1-methylethyl-2-chloroethylsulphite
2(p-tert.-Butylphenoxy)cyclohexyl-2-propinylsulphite
4,4'-Dichloro-N-methylbenzenesulphonanilide
N-(2-Fluoro-1,1,2,2-tetrachlorethylthio)-methanesulphonanilide
2-Thio-1,3-dithiolo-(4,5,6)quinoxaline (thioquinox)

Chloromethyl-p-chlorophenylsulphone (Lauseto new)
1,3,6,8-Tetranitrocarbazole and
Prop-2-ynyl-(4-t-butylphenoxy)-cyclohexylsulphite (propargyl).

These agents can be used in the form of solutions, emulsions, suspensions, granules or dusting agents. The methods of application depend on the end uses and must ensure that the active substance can be finely distributed.

To manufacture solutions, it is possible to use solvents, such as especially alcohols, for example ethylalcohol or isopropylalcohol, ketones, such as acetone or cyclohexanone, aliphatic hydrocarbons, such as kerosene, and cyclic hydrocarbons, such as benzene, toluene, xylene, tetrahydronaphthalene, alkylated naphthalenes, and also chlorinated hydrocarbons, such as tetrachloroethane and ethylenechloride, and finally also mineral and vegetable oils or mixtures of the abovementioned substances.

The aqueous preparation forms are preferably dispersions. The active substances, as such or in one of the abovementioned solvents, are homogenised in water, preferably by means of wetting agents or dispersing agents. As cationic dispersing agents, quaternary ammonium compounds may be mentioned as examples; as anionic dispersing agents, soaps, aliphatic, long-chain sulphuric acid monoesters, aliphatic-aromatic sulphonic acids and long-chain alkoxy acetic acids may for example be mentioned; and as non-ionic dispersing agents, polyglycol ethers of fatty alcohols or ethylene oxide condensation products with p-tert. alkylphenols may be mentioned. On the other hand, it is also possible to manufacture concentrates consisting of active substance, emulsifier or dispersing agent and, where appropriate, solvent. Such concentrates can be diluted, for example with water, before use.

Dusting agents can be manufactured by mixing or conjoint grinding of active substance with a solid carrier. Possible carriers are, for example, talc, diatomaceous earth, kaolin, bentonite, calcium carbonate, boric acid and tricalcium phosphate, but also wood flour, cork powder, charcoal and other materials of vegetable origin. The active substances can however also be absorbed on the carriers by means of a volatile solvent. Pulverulent preparations and pastes can also be rendered capable of suspension in water, and usable as spraying agents, by adding wetting agents and protective colloids.

In many cases the use of granules for the uniform release of active substances over a longer period of time is of advantage. These granules can be manufactured by dissolving the active substance in an organic solvent, absorption of this solution by granular material, for example attapulgite or $SiO_2$, and removal of the solvent. They can also be manufactured by mixing the active substance of formula I with polymerisable compounds, after which a polymerisation is carried out which leaves the active substances unaffected, with the granulation being effected whilst the polymerisation is still proceeding.

The content of active substance in the agents described above is between 0.1 and 95 percent, and at the same time it should be mentioned that in the case of application from aircraft or by means of other suitable application devices, concentrations of up to 99.5 percent, or even pure active substance, are employed.

EXAMPLE 1

Formulation

Dusting Agents

Equal parts of an active substance according to the invention and of precipitated silica are finely ground. Dusting agents preferably containing 1–6 percent of active substance can be manufactured therefrom by mixing with kaolin or talc.

Spraying Powders

To manufacture a spraying powder, the following components are, for example, mixed and finely ground:

50 parts of active substance according to the present invention
20 parts of highly adsorbent silica
25 parts of Bolus alba (kaolin)
1.5 parts of sodium 1-benzyl-2-stearyl-benzimidazole-6,3'-disulphonate, and
3.5 parts of a reaction product of p-tert.octylphenol and ethylene oxide.

Emulsion Concentrate

Easily soluble active substances can also be formulated as an emulsion concentrate in accordance with the following instruction:

20 parts of active substance
70 parts of xylene and 10 parts of a mixture of a reaction product of an alkylphenol with ethylene oxide and calcium dodecylbenzenesulphonate are mixed. On dilution with water to the desired concentration, a sprayable emulsion results.

Granules 7.5 g of an active substance of formula I are dissolved in 100 ml of acetone and the acetone solution thus obtained is added to 92 g of granular attapulgite. The whole is well mixed and the solvent is stripped off in a rotary evaporator. Granules containing 7.5 percent of active substance are obtained.

EXAMPLE 2

The compounds of formula $$\begin{array}{cc}
\text{Br} & \text{Br} \\
\text{N=C} & \text{N=C} \\
\quad\quad\text{NH} \quad \text{and} & \quad\quad\text{NH} \\
\text{C=C} & \text{C=C} \\
\text{Br Br} & \text{Cl Cl} \\
\text{(III)} & \text{(IV)}
\end{array}$$

were tested in the following manner for their action against Rhipicephalus bursa, phosphoric acid ester-sensitive and phosphoric acid ester-resistant Boophilus microplus and Dermanyssus gallinae.

A. Rhipicephalus bursa

Five adult, hungry ticks were dipped for 1 to 2 minutes in 2 ml of an aqueous emulsion of an active substance in a test tube. These aqueous emulsions had an active substance content of 100, 50, 10, 1, 0.5 or 0.1 ppm. The test tube was then closed with a cottonwool pad and turned in such a way that the emulsion of active substance could be absorbed by the cottonwool. The evaluation took place after 2 weeks. Two repeats were carried out for each experiment.

A 100 percent kill took place at the following limiting concentrations.

Compound III — 100 ppm.
Compound IV — 100 ppm.

B. Boophilus microplus (larvae and imago)

Experiments, with two repeats, were carried out in accordance with the method described above, with 10 phosphoric acid ester-sensitive and 10 phosphoric acid ester-resistant Boophilus microplus larvae. (The resistance relates to the toleration of diazinone).

A 100 percent kill was found to have resulted after 2 weeks at the following limiting concentrations in ppm:

|  | B. microplus resistant larvae | B. microplus sensitive larvae |
|---|---|---|
| Compound III | 100 ppm. | 100 ppm. |
| Compound IV | 100 ppm. | 100 ppm. |

C. Dermanyssus gallinae

The test was carried out analogously to Method A, but with 10 mites. The evaluation took place after 72 hours.

A 100 percent kill occurred at the following limiting concentrations:

Compound III — 100 ppm.
Compound IV — 100 ppm.

EXAMPLE 3

A dusting agent manufactured according to Example 1, based on talc and containing the active substance of formula $$\begin{array}{c}
\text{Br} \\
\text{N=C} \\
\quad\quad\text{NH} \\
\text{C=C} \\
\text{Br Br}
\end{array}$$

was distributed on filter paper in concentrations of 200, 100, 50, 25, 12, 6, 3, 1.5 and 0.8 mg of active substance per m$^2$. Five test subjects at a time of the types indicated below were placed on the treated substrates. The experiments were evaluated after 24 hours, and a 100 percent kill was found at the following limiting concentrations in mg/m$^2$.

| | |
|---|---|
| Phyllodromia germanica | 1.5 |
| Periplaneta americana | 50 |
| Blatta orientalis | 100 |
| Tenebrio molitor, imago | 25 |
| larvae | 200 |
| Dermestes frischii, imago | 200 |
| larvae | 200 |
| Attangenus piceus, larvae | 200 |
| Acheta domesticus, larvae in stage 5 | 100 |
| Sitophilus granarius | 200 |

We claim:

1. A method of combatting insects and acarina comprising applying thereto an insecticadally or acaricidally effective amount of a compound of the formula $$\begin{array}{c}
\text{X}_4 \\
\text{N=C} \\
\quad\quad\text{NH} \\
\text{C=C} \\
\text{X}_5 \text{ X}_6
\end{array}$$

wherein one of $X_4$, $X_5$ and $X_6$ represents bromine and others of $X_4$, $X_5$ and $X_6$ represent chlorine or bromine.

2. A method according to claim 1 in which the compound is $$\begin{array}{c}
\text{Br} \\
\text{N=C} \\
\quad\quad\text{NH} \\
\text{C=C} \\
\text{Br Br}
\end{array}$$

3. A method according to claim 1 in which the compound is $$\begin{array}{c}
\text{Br} \\
\text{N=C} \\
\quad\quad\text{NH} \\
\text{C=C} \\
\text{Cl Cl}
\end{array}$$

4. A method according to claim 1 in which the compound is
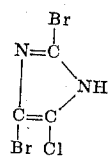
* * * * *